US007526380B2

(12) United States Patent
Olague et al.

(10) Patent No.: US 7,526,380 B2
(45) Date of Patent: Apr. 28, 2009

(54) METHOD AND SYSTEM TO PROVIDE A GLOBAL MULTIUSER SERVICE OF LOCALIZATION INFORMATION WITH INTEGRITY AS REQUIRED UNDER LIABILITY OR COMMERCIAL ISSUES

(75) Inventors: Miquel Angel Martinez Olague, Tres Cantos-Madrid (ES); Joaquin Cosmen Schortmann, Tres Cantos-Madrid (ES); Juan Ramon Martin Piedelobo, Tres Cantos-Madrid (ES); Miguel Romay Merino, Tres Cantos-Madrid (ES)

(73) Assignee: GMV Aerospace and Defence, S.A. (ES)

( * ) Notice: Subject to any disclaimer, the term of this patent is extended or adjusted under 35 U.S.C. 154(b) by 774 days.

(21) Appl. No.: 11/002,923

(22) Filed: Dec. 2, 2004

(65) Prior Publication Data

US 2005/0246093 A1 Nov. 3, 2005

Related U.S. Application Data

(60) Provisional application No. 60/526,185, filed on Dec. 2, 2003.

(51) Int. Cl.
*G01C 21/26* (2006.01)
*G01S 5/14* (2006.01)
*G06F 19/00* (2006.01)

(52) U.S. Cl. .................. 701/213; 701/215; 342/357.02

(58) Field of Classification Search ................. 701/213, 701/215; 340/426.12; 342/357.06, 357.02, 342/357.04, 357.14, 358
See application file for complete search history.

(56) References Cited

U.S. PATENT DOCUMENTS

| | | | | |
|---|---|---|---|---|
| 6,466,846 | B2 * | 10/2002 | Maynard | 701/13 |
| 6,826,476 | B2 * | 11/2004 | Ahlbrecht et al. | 701/213 |
| 6,992,617 | B2 * | 1/2006 | Diggelen et al. | 342/357.02 |
| 2003/0107513 | A1 * | 6/2003 | Abraham et al. | 342/357.1 |

* cited by examiner

*Primary Examiner*—Tan Q Nguyen
(74) *Attorney, Agent, or Firm*—Cantor Colburn LLP

(57) ABSTRACT

A system to provide to different users with information about position coordinates of remote mobile vehicles or individuals (mobile agent) guarantying that each particular position data, as it is provided to the user, is within certain error boundaries. The system is composed by a number of mobile units (MU) installed at the mobile agents and a Central Platform (CP). The MU consists of a GPS/SBAS and/or a Galileo navigation receiver that includes specific autonomous integrity algorithms and a transceiver to transmit GPS/SBAS and/or Galileo derived data to the CP. The CP receives data from MU and enhances position estimation and position integrity. Integrity is guaranteed by the use of a GNSS Integrity service (either provided by SBAS or Galileo) and specific autonomous integrity algorithms that ensure the position integrity in non-controlled environments. The CP provides access to MUs position data to multiple Users via Internet or dedicated telecommunications links. Integrity guarantee of provided position data allows the Users to employ provided position data for legal or commercial purposes where auditability and traceability of position error is required. Besides the support of multiple Users on a single MU allows for the provision of different types of position based services based on the same mobile device.

17 Claims, 2 Drawing Sheets

Figure 1:
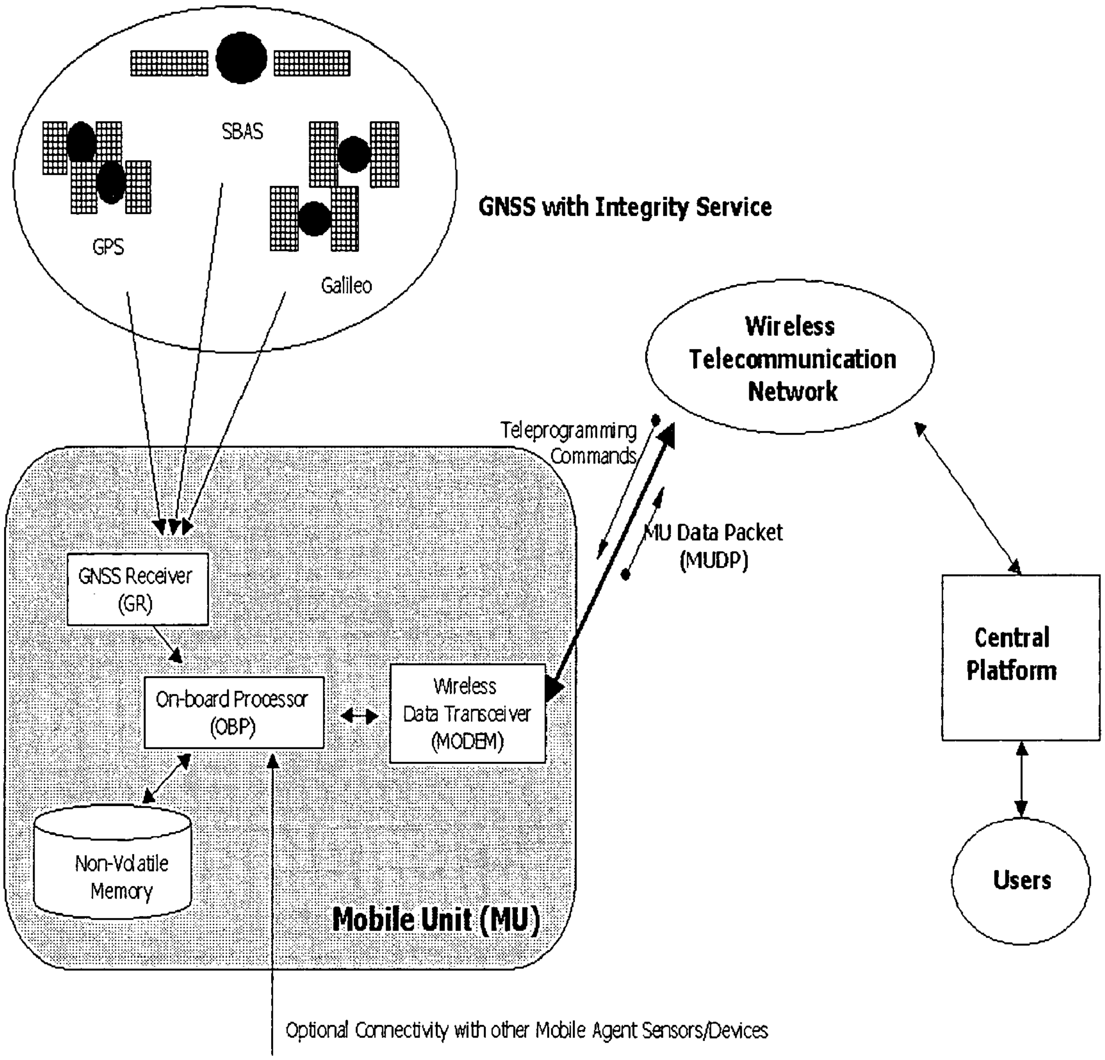

METHOD AND SYSTEM TO PROVIDE A GLOBAL MULTIUSER SERVICE OF LOCALIZATION INFORMATION WITH INTEGRITY AS REQUIRED UNDER LIABILITY OR COMMERCIAL ISSUES

The present is a non-provisional patent application based on provisional application Ser. No. 60/526,185 filed on Dec. 2, 2003, which is hereby incorporated by reference.

REFERENCES CITED

U.S. Patent Documents

1 Gauke Apparatus and method for U.S. Pat. No. 6,072,396 Jun.6, 2000 continuous electronic monitoring and tracking of individuals, which is hereby incorporated by reference.

2 U.S. Pat. No. 5,225,842 Brown, Jul. 6, 1993 Vehicle tracking et al. system employing global positioning system, which is hereby incorporated by reference.

3 U.S. Pat. No. 60/526,314 Nestor, Dec. 2, 2003 Provisional Patent et al. Application, now U.S. application Ser. No. 11/008,853 titled: "Patent GNSS Navigation Solution Integrity in non-controlled environments," which is hereby incorporated by reference.

FIELD OF THE INVENTION

Present invention can be applied in a wide diversity of fields, whenever position/velocity information is used between parties with liability (either legal, administrative or economical) implications, some examples of the fields of applications are:

Position dependant billing systems: Applications for automatic tolling, road pricing, congestion control, zone fees, city parking tolling, etc. The system described guarantees that position derived billing is based upon information whose error is bounded. Thus probability to have billing claims due to out of bounds errors is controlled to required level.

Position dependant law enforcement systems: Whenever position and velocity information is used as evidence with legal implications the system described guarantees involved parties a error-bounded position evidence. This can be for instance applied for traffic law enforcement as well as surveillance of parolees.

Position dependant taxes collection: Whenever position, velocity and time information is used as the basis for taxes collection for instance for road and urban environments where specific taxes policies can be implemented.

Fleet Management Systems: Fleet Management System where position is recorded and used as evidence to solve disputes with clients or employees. The system described provides an error-bounded position evidence.

BACKGROUND OF THE INVENTION

Global Navigation Satellite Systems (GNSS) as the one currently available GPS or the Galileo system in the future have found a great diversity of applications. Among them their use to monitor localization of mobile agents (vehicles, individuals, assets etc) have encountered ample proliferation. The basic concept is to make available in a central platform the position information derived from GPS and to exploit that information with different application specific purposes.

Examples of those applications are Automatic Vehicle Location, Fleet Management Systems, Road Pricing or Automatic Tolling Applications.

Some of those applications intend to use position information not only to improve operational efficiency but also as a proof to elucidate economical or liability issues between parties. In those cases each position data record must be guaranteed to be within required accuracy limits otherwise affected (economically or liability) party could reject validity of information. In present systems it is assumed that error of position information is within required limits for the application for which it is used based on errors statistics. However the user of the information does not have any guarantee that the error in a particular position record is within specific boundaries. In other words although error statistics could be within acceptable limits, one particular position record may have an error out of acceptable limits for the application.

The system described in present invention solves this problem, providing the user with the guarantee that if a position record is positively flagged its error is within specified limits (Integrity guarantee).

One key issue for the application feasibility is the link between the integrity risk and the legal concept of evidence: The concept of evidence has to be understood as a probabilistic parameter and it is to be legally defined what is the failure probability that a Court can accept as evidence. While the proposed system could be tuned to any legal conclusion, it is initially anticipated based on existing jurisprudence, that values of $10^{-7}$ as usually defined by Safety Critical Applications are well below typical values used legally: statistics of judicial errors together with jurisprudence in probability related fields (as it is the case of the use of DNA evidences to demonstrate the authority of a crime or the paternity).

Present invention is supported and is a direct application of a two innovative concepts and methods:

[1] A method to guarantee GNSS positioning Integrity performance under non-controlled environments. This new method allows assuring within a probability level that each individual position data is within certain error limits when it is positively flagged. This new method is itself subject of another patent application being presented in parallel, titled "GNSS Navigation Solution Integrity in non-controlled environments (Ref [3]).

[2] Application of the Integrity concept in the Legal or commercial field. Integrity Service as provided by Space Based Augmentation Systems (SBAS) (WAAS, EGNOS, MSAS . . . ) and by future Global Navigation Satellite Systems (GNSS) such as Galileo are conceived and driven by its use for safety critical applications mainly Civil Aviation. However, the Integrity defined as ". . . a measure of the trust that can be placed in the correctness of the information supplied by the system . . ." is understood to have an essential value for other non "safety-critical" navigation applications where the use of the navigation solution is to be applied with some purposes that imply certain liabilities either commercial, legal or government policy implementation ones.

The present invention provides the basis for the exploitation of a navigation solution with guaranteed integrity for the so-called "liability-critical" applications i.e. those applications where the use of the provided solution is associated to a certain liability and hence, a guaranteed navigation solutions (with errors properly bounded) is essential.

This concept is based upon the following rationale:

[a] In the legal, contractual and commercial fields there are situations where GNSS position or velocity data is used as evidence to proof or resolve a particular issue.

[b] GNSS position or velocity data is subject to errors, this means that the difference between the provided position or velocity and the actual position and velocity is not null and its magnitude cannot be predetermined.

[c] GNSS position and velocity accuracy defined as the statistically determined standard deviation of GNSS position and velocity error does not guarantee that an individual GNSS position and velocity data be within certain error boundaries.

[d] The Integrity concept has been used for a long time in safety critical navigation sensors, and in particular in GNSS safety critical application, where GNSS position or velocity error can put into risk the life of individuals. This magnitude establishes the probability for the measurement device to provide data with error superior to pre-established error boundaries without informing the user of such a situation.

[e] As a result of previous points, it is not the statistical determined accuracy of the measurement device but the Integrity of it what should determine if a particular GNSS position or velocity can be or not used as evidence.

Mentioned Integrity Requires:

They use a Signal In Space with built-in integrity as defined by ICAO GNSS Requirements.

They implement specific integrity algorithms as the ones identified in [1].

MU has been subject to a "type approval" process that legally ensures that they have been designed and developed in line with the required procedures.

An appropriate contractual and legal framework is established among the different actors (GNSS service provider, certification authority, users and mobile agent).

SUMMARY OF THE INVENTION

Present invention presents a system to provide to different Users with information about position or velocity coordinates of remote mobile agents guarantying with certain probability, that each particular position or velocity data, as it is provided to the User, and when positively flagged is within certain established error boundaries (Protection Levels). The system is composed by a mobile unit (MU) installed at the mobile agent and a Central Platform (CP). The MU consists of a GPS/SBAS and/or a Galileo navigation receiver and a transceiver to transmit GPS/SBAS and/or Galileo derived data to the CP. The CP receives data from MU and cross-checks the position integrity. Integrity is guaranteed by the use of a GNSS Integrity service (either provided by SBAS or future GPS III or future Galileo) and specific algorithms that ensure the position integrity in non-controlled environments. The CP provides access to MUs position data to multiple Users via Internet or dedicated telecommunications links. Integrity guarantee of position data allows User the data for legal or commercial purposes or to provide the Mobile Agent or third parties with added value services where Integrity is critical.

DRAWINGS

The accompanying drawings, which are incorporated in and form a part of this specification, illustrate embodiments of the invention and, together with the description, serve to explain the principles of the invention:

FIG. 1: Mobile Unit

Figure 2:
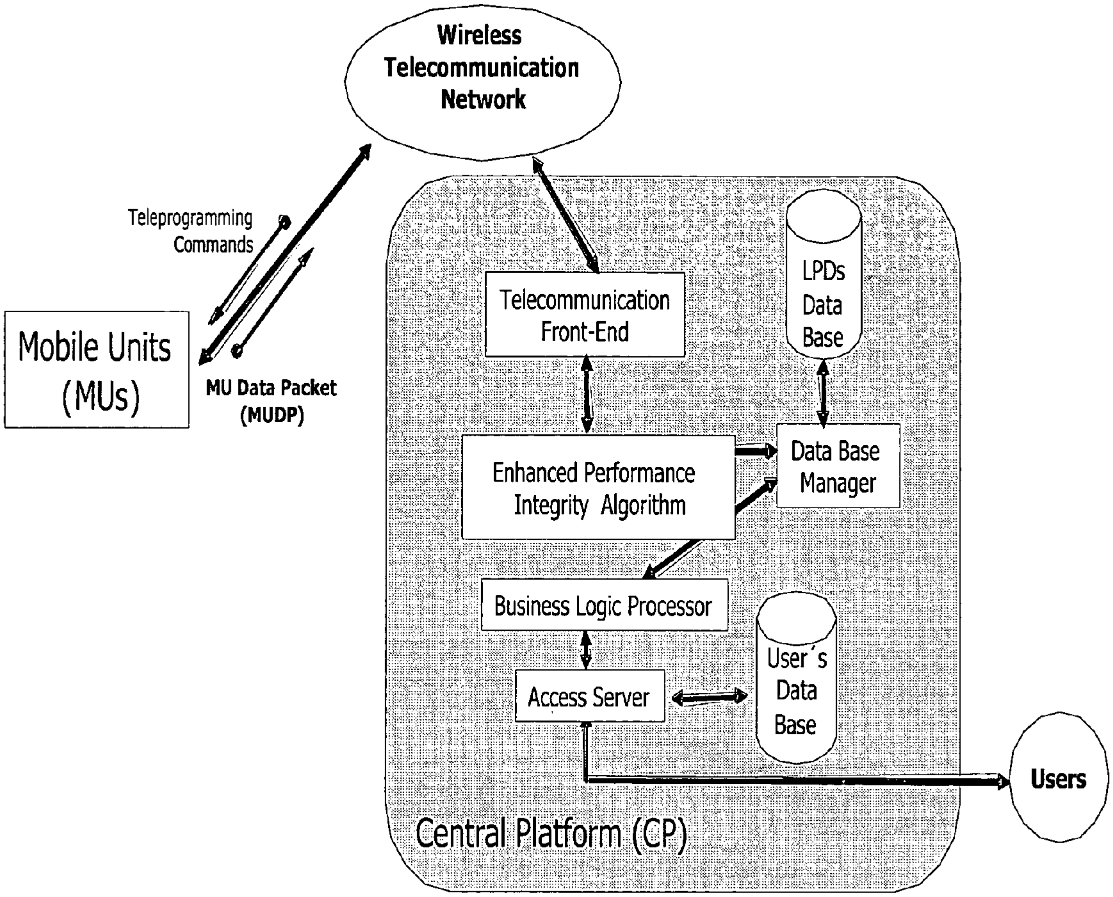

FIG. 2: Central Platform

DETAILED DESCRIPTION OF THE INVENTION (PREFERRED EMBODIMENT)

Reference is now made in detail to the embodiment of the invention. While the invention is described in conjunction with the preferred embodiment, it is understood that they are not intended to limit the invention to this embodiment. On the contrary, the invention is intended to cover different implementations. Furthermore, in the following detailed description, numerous specific details are incorporated in order to provide an easy understanding of the invention The System provides to different Users with information about position coordinates of remote Mobile Units. Each provided position co-ordinates, velocity and time are accompanied by Integrity Information. The Integrity Information consists on an Integrity Flag and Protection Levels. The Integrity Flag when positive indicates that provided position coordinates have an error that is within provided Protection Levels with a probability greater than one minus the Integrity Risk. The System object of present invention guarantees that the probability of the Integrity Flag to not indicate that provided position coordinates have an error superior to the specified Protection Level is lower than an specified value—Integrity Risk—.

The system is composed by Mobile Units (MUs) carried by the Mobile Agents and a Central Platform (CP):

Mobile Units (MU). The MUs are carried by the mobile agents whose position coordinates are to be provided by the CP to the Users.

In FIG. 1 the main components and interfaces of the MU are shown. The MU is composed by a GNSS receiver (GR) with its corresponding antenna—GPS/SBAS receiver or a Galileo receiver or GPS/SBAS/Galileo receiver—an On Board Processor—OBP—a wireless data telecommunications transceiver with its corresponding antenna (MODEM)—GR antenna and MODEM antenna may be combined—and a non-volatile memory. Additionally the MU (through OBP interfaces), is not required to but, may have interfaces with other external Mobile Agents devices like: sensors carried by the Mobile Agent (PDA, Console with display and keyboard etc).

The MU receives the navigation signal (GPS, Galileo or both) trough the GR and the SBAS messages. SBAS information messages can be received by the MU in either way, directly from the SBAS geostationary satellite through the GR—SBAS enabled GR—or indirectly through a ground based wireless telecommunication network via the MODEM. The OBP of the MU—or the GR depending on the implementation—estimates its position coordinates and associated Protection Level. If the Protection Level can not be computed with required Integrity Risk, then an Integrity Unhealthy flag is issued to accompany obtained position to indicate that error can not be bounded with established Integrity Risk. MU uses SBAS Integrity information about GPS satellites and ionosphere and an Autonomous Integrity Algorithm in order to compute position and Protection Levels. The results: Position estimate, Integrity healthy/unhealthy flag and the Protection Levels are encoded in the a data packet that the MU transmits through the MODEM to the CP. This data packet is called hereinafter MU data packet or MUDP.

The MUDP content is obtained by the OBP of the MU at a fix frequency rate (Hz for instance), in a typical embodiment of the system the MUDP is formed by:

Current Date and Time of the Day: Date and Time of the day at the instant of MUDP transmission.

Last available GNSS position and velocity (available whatever the integrity were)

Integrity flag and Protection Levels of previous GNSS position and velocity

Date and time of the day correspondent at the instant of computation of previous GNSS position Last available GNSS position and velocity with a positive Integrity flag and correspondent protection levels Raw Data used by the GR to compute previous position and velocity (pseudorange and carrier phase measurements, sat Ids, GNSS nav messages)

Date and time of the day correspondent at the instant of computation of previous GNSS position.

External devices data (optionally)

In order to allow the system to support different Users, the MU provides MUDPs to the CP in two different ways:

1) Real Time MUDPs: The MU transmits last available MUDP when a transmission event occurs. Transmission events are configured by the CP via a teleprogramming command. The following Transmission events can be configured CP Polling: Last available MUDP is transmitted when the MU receives from the CP a polling command.

Preconfigured Time Intervals: MUDPs are transmitted to the CP at fix time intervals teleprogrammed by the CP.

Preconfigured Traveled Distance Intervals: MUDPs are transmitted to the CP at fix distance intervals teleprogrammed by the CP. Distance is computed by the OBP integrating Mobile Agent trajectory as derived by GNSS positions.

Position/velocity based events: The OBP can be configured to check if any of the following transmission events occurs:

Position positively integrity flagged accomplishes a configured condition (to be inside or outside a closed area, to be nearer than a configured distance to a configured position, to farer than a configured distance to a configured position, . . .

The same whatever the integrity flag value were

Velocity positively integrity flagged accomplishes a configured condition (higher than a configured value, higher than a position dependant configured value)

The same whatever the integrity flag value were

Events based on observables coming from external connected sensors: In the case that the OBP were interfaced with external Mobile Agent sensors, the OBP can be configured to check if transmission events dependant of a configured conditions occurs.

MU detectable events directly triggered by external devices: In the case that the OBP were interfaced with external Mobile Agents sensors or devices capable directly to generate a discrete signal, the OBP can be configured to check status of such a signal as transmission events.

2) Logged MUDPs: Non volatile memory of the MU is used by the OBP to continuously register generated MUDPs, upon direct command of the CP or in accordance with configured transmission events for downloading of logged MUDPs, the MU transmits all logged MUDPs to the CP.

In either case MUDPs transmission events are teleprogrammed by the CP in accordance with User configured parameters for Location Packet Data—LPD—availability. Since more than one User can have access to position data of a single MU and each access can have different accessibility requirements, transmission events for a particular MU result from making a logical OR condition of transmission events resulting from each User accessibility requirements.

The Central Platform (CP). The CP provides to multiple authorized Users the defined localization information—LPDs—based on the reception and processing of MU data packets—MUDP—. Received MUDPs are processed to obtain the correspondent LPDs in accordance with configured User parameters and stored in a secure data base implementing all legal requirements related to data privacy. CP also implements additional algorithms that enhances position estimation performances in terms of actual error and Protection Level reduction using additional information, in particular Geographic information and mobile agent dynamic constraints (Enhanced Performance Integrity Algorithm). The CP provides access to the User to Mobile Agents LPDs for which the User is authorized to access by the Mobile Agent. The validity of the access can be limited by the expiry date of the authorization. Additionally the access can be restricted to certain time, position or velocity conditions.

The CP coordinates the reception, storage and delivery to Users of the Mobile Agents Localization Information. In addition applies a privacy policy secure enough to protect the data of all Mobile Agents. Different embodiments of the CP are possible. FIG. 2 illustrates a particular embodiment of the CP.

The Telecommunication front-end shown in FIG. 2, centralizes incoming and outcoming data transfers between CP and the MUs. Several entities of information are interchanged between de CP and the MU as outlined below:

1. Tele-programming parameters, from the CP to the MU, these parameters shall configure MUDP transmission events for each MU interfacing with the CP as described previously.
2. User positions data packages—MUDPs—, from the MU to the CP, MUDPs transmission events are accordingly to tele-programmed configuration as described previously.
3. Delete command, from the CP to the MU, to make the MU to remove all MUDPs logged at the Non Volatil Memory of the MU.
4. Download command, from the CP to the MU, to prompt the MU to download recorded data to the CP.

The Enhanced Performance Integrity Algorithm function implements specific integrity functions that improve position estimation (thus reduces actual position error) and reduce the Protection Level maintaining the Integrity Risk and cross check the integrity information as was established by the Mobil Unit. This algorithm is described in the invention referred in Ref [3].

The Data Bases (DB) and Corresponding DB Manager archives and retrieves two sets of data:

1. Mobile Unit identification as well as LDP of the different MU's, provided integrity is ensured by the corresponding Integrity Flag and Protection Levels. The Data Base archives the LDP in a relational DB according to a predefined structure that allows an appropriate management of data privacy requirements. Information on specific MU configuration as required to satisfy User's needs is also archived.

2. Users DB containing the User configured parameters for Location Packet Data—LPD—availability:
   - Type of data either raw (e.g. position and velocity) or processed information such as distance traveled.
   - Data accessibility restrictions: Conditions applicable to restrict access of User to MU LPDs (e.g., only when MU is inside certain area)
   - Periodicity of the information to be provided or events when information has to be provided
   - A clear identification of MU's whose position/velocity data can be accessible for each User is also provided.

The Business Logic Processor is the core of the CP as it allows:

1. Creating MU configuration parameters that combine the needs of the different Users.
2. Create from the LDP Data Base the information required by each user according to their needs as above defined either on a periodical basis or on event.
3. Provide the processed information (e.g. reports) to the Access Server.

Finally, the Access Server allows the User to access in a secure manner to authorized information according to the pre-established contract.

The overall system maintains interfaces with the following third parties elements and systems:

- The Global Navigation Satellite System—GNSS—with Integrity performance: GPS complemented with SBAS (WAAS in USA or EGNOS in Europe) or future GPS III or Galileo (assuming they will accomplish equivalent Integrity performances than current GPS/SBAS) complemented or not with SBAS feeds both MU and CP of the system.
- Wireless Telecommunication Network, Data transmission between MU and CP is accomplished using a public or private wireless telecommunication network. Public cellular networks like GSM-SMS, GSM-GPRS, CDMA or UMTS can be used depending on the particular embodiment of the invention.
- Users. Users are public or private companies or organizations that have access to the CP Localization Information—LPDs—. User must be authorized either by the Mobile Agent or by a legal authority to have access to his LPDs. These Users take advantage of LPDs provided by the CP to support their operation (for instance Toll Collect or Road Pricing Operators) or to generate localization Based Services for end users (for instance Automatic Vehicle Location/Fleet Management Services), other potential Users are: Insurance companies, traffic authorities, surveillance bodies, law enforcement bodies, regulators, etc. Thanks to the ability of the system to support provision to multiple Users of Mobile Agent localization information based upon a single MU, the Mobile Agent carrying a single MU gains access to a wide variety of services provided by system Users: free flow automatic tolling, automatic payment of taxes in congestion control systems, security services, etc. On the other hand Users have the advantage to share the same infrastructure between them.

What is claimed is:

1. A system that provides to one or more users with information about position coordinates of one or more remote vehicles or individuals Mobile Agents in any environment as obtained from GPS/SBAS signals complemented with an Integrity Guarantee Information, the Integrity Guarantee Information means that the system provides besides the position coordinates a Protection Level, where Protection Level means a limit such that the probability that the actual position error be above it is lower than a value called Integrity Risk, the system further comprising Mobile Units MUs, each mobile Unit being carried by each Mobile Agent and a Central Platform CP, each Mobile Unit comprising a GPS/SBAS receiver and an On Board Processor, OBP, a wireless data telecommunications transceiver MODEM and a non-volatile memory, wherein the Mobile Unit receives the navigation signal GPS and the SBAS messages from a SBAS geostationary satellite through the GPS SBAS receiver, the Mobile Unit estimates its position coordinates and associated Protection Level, and if the Protection Level can not be computed with a required Integrity Risk, then an Integrity Unhealthy flag is issued to accompany the obtained position to indicate that the position error can not be bounded with the required Integrity Risk, in order to compute said position and Protection Levels the Mobile Unit uses SBAS and ionosphere Integrity information about GPS satellites and an Autonomous Integrity Algorithm, and provides the following information: position estimate, Integrity healthy/unhealthy flag and the Protection Levels, which are encoded in a data packet that the Mobile Unit transmits through the MODEM to the Central Platform, the Central Platform providing to multiple authorized users with localization information and associated Integrity Information based on the reception and processing of the data packets received from Mobile Unit, the Central Platform coordinates the reception, storage and delivery to user s of the Mobile Agents Localization Information, and in addition applies a privacy policy secure enough to protect the data of all Mobile Agents.

2. The system of claim 1, wherein the system provides also velocity coordinates of mobile agents.

3. The system of claim 1, wherein the system algorithm used to determine position and Integrity Information, the Autonomous Integrity Algorithm, is based on a GARAI, GNSS-Aided Receiver Autonomous Integrity, algorithm.

4. The system of claim 1, wherein the Mobile Unit satellite navigation receiver is a Galileo or GPS and Galileo combined receiver augmented or not with SBAS.

5. The system of claim 1, wherein SBAS Integrity Information is obtained through other transmission means different to the SBAS Geostationary Satellite.

6. The system of claim 1, wherein satellite and Ionosphere Integrity Information is obtained through other means different than SBAS as local augmentation systems or even through future GPS evolutions GPS III and/or Galileo system themselves if they provide such information in compatibility with overall Integrity Risk.

7. The system of claim 1, wherein the Central Platform performs Enhanced Performance Integrity Algorithms with the aim to reduce position estimation error and reduce correspondent Protection Levels, maintaining the required Integrity Risk based on additional information or additional considerations dependant on the application.

8. The system of claim 7, wherein the Enhanced Performance Autonomous Integrity Algorithms used by the Central Platform are based on a GARAI, GNSS-Aided Receiver Autonomous Integrity, algorithm.

9. The system of claim 1, wherein the wireless communication system is based in a private or public cellular network or satellite communications.

10. The system of claim 1, wherein the Mobile Unit described components are integrated via at least one of: Satellite Navigation receiver and On-board processor are combined; On-board processor and MODEM are combined; and Satellite Navigation Receiver, On-board processor and MODEM are combined.

11. The system of claim 1, wherein the Mobile Unit has additional interfaces with other external devices like: PDA, Display, keyboard, etc.

12. The system of claim 1, wherein the Mobile Unit has additional interfaces with a vehicle odometer in order to use its measurements to obtain position estimates during GPS and/or Galileo outages or to use its information to enhance performances of the Autonomous Integrity Algorithm with aim to reduce position estimation error and reduce correspondent Protection Levels, maintaining required Integrity Risk.

13. The system of claim 1, wherein the Autonomous Integrity Algorithm and position and/or velocity computation algorithms run in whole or in part in the Central Platform instead of running in the Mobile Unit.

14. The system of claim 1, wherein Mobile Unit data packets are stored in the MU non-volatile memory and are transmitted to the Central Platform at certain predefined intervals, or when the Central Platform asks the Mobile Unit to transmit them, or when a particular geographical condition happens.

15. The system of claim 1, wherein the system further makes accessible to one or more users of the mobile Agents, which position related data contents can be different for each user, said possible position related data contents being at least one of: latest available position coordinates with Integrity Information, latest available geographic related coordinates with Integrity Information, position coordinates at a past time with Integrity Information, geographic related coordinates at a past time with Integrity Information, position or geographic coordinates during a past interval with Integrity Information, latest occurrence of position coordinates accomplishing a geographic condition geofencing event, geofencing events happened during a past interval.

16. The system of claim 15, wherein accessibility of each user to position related data is restricted by criteria that can be different for each user, and is at least one of: only position data whose date and time are inside an specified time interval are accessible by the user; only position data with position coordinates inside certain geographical area or zone are accessible by the user; only position data packets with position coordinates outside a certain geographical area or zone are accessible by the user; and only position data packets with velocity above certain limits are accessible by the user.

17. The system of claim 15, wherein the system transmits said position related data contents to the user at a certain predefined time or at predefined distance intervals or when a certain geographic event occurs or when a certain velocity event occurs, the data transmission being such that the time lag between the time when the Mobile Unit is actually in a position and the corresponding position data is actually provided to the user is intended to be as short as possible.

* * * * *